April 28, 1959　　R. B. SHULTERS ET AL　　2,883,891
DRILL UNIT

Filed Sept. 29, 1955　　2 Sheets-Sheet 1

INVENTORS
ROBERT B. SHULTERS
CLAUDE L. ROBINSON
BY
ATTORNEY

April 28, 1959

R. B. SHULTERS ET AL 2,883,891

DRILL UNIT

Filed Sept. 29, 1955

INVENTORS
ROBERT B. SHULTERS
CLAUDE L. ROBINSON
BY *signature*
ATTORNEY

United States Patent Office 2,883,891
Patented Apr. 28, 1959

2,883,891
DRILL UNIT

Robert B. Shulters and Claude L. Robinson, Spring Lake, Mich., assignors to Gardner-Denver Company, Quincy, Ill., a corporation of Delaware Application September 29, 1955, Serial No. 537,377

10 Claims. (Cl. 77—55)

This invention relates to rotary drills and the like and means associated therewith for limiting the rate of feed thereby reducing to a uniform rate of feed the pressure exerted by the operators thereof. Furthermore, the depth of hole drilled is adjustably limited by this invention.

One of the objects of this invention is to provide a device to adjustably limit the rate of feed and depth of penetration of portable rotary electric or fluid pressure tools under pressure generated by the operators of such tools. Adjustable limitation of the feed rate is desirable to prevent improper feed rates and to control the break through to prevent tearing of material being drilled as the drill point breaks through the material being drilled at the completion of the drilling operation.

A further object of this invention is to provide adjustable stop means for limiting the depth of penetration of a tool into the work-piece.

Other objects and features of this invention will become apparent from the following specifications and drawings, in which.

Generally, there is provided a device which may be integral with or attached to a conventional drill, to adjustably limit the feed rate at which the drill can be advanced against the work-piece and having adjustable stop means to control the depth of penetration of the tool into the work-piece.

Figure 2:
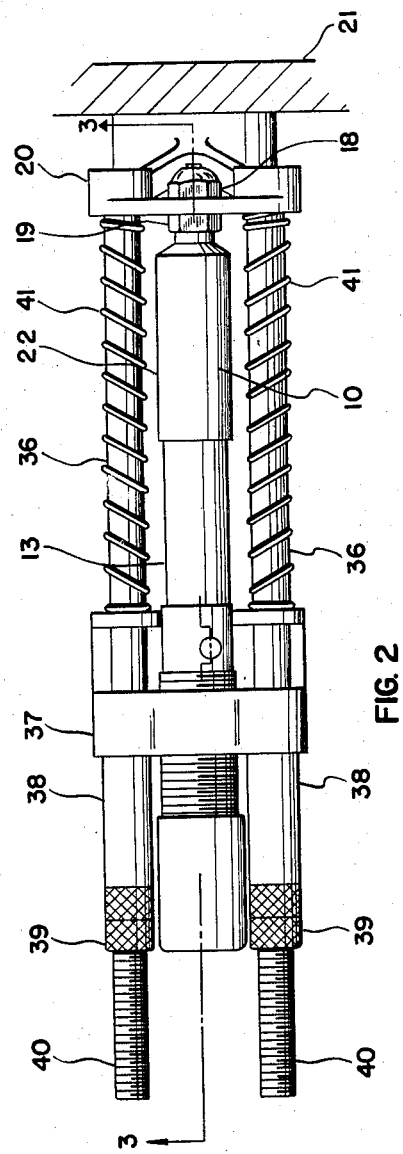
Fig. 2 is a top plan view of the invention.
Figure 1:
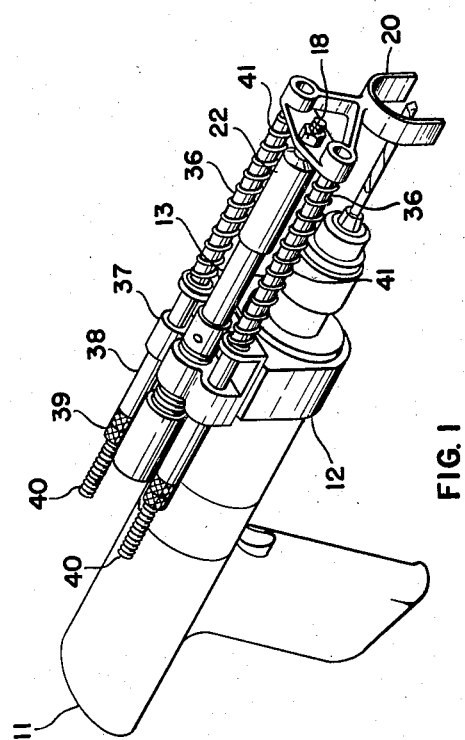
Fig. 1 is a perspective view showing the invention and indicating how it may be attached to an electric or fluid pressure tool.
Figure 3:
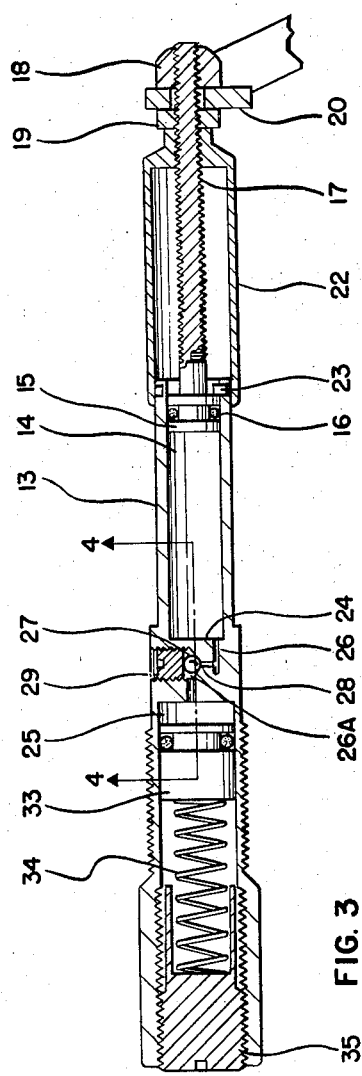
Fig. 3 is an enlarged vertical sectional view taken along the line 3—3 of Fig. 2, showing the adjustable element serving to control the speed at which the tool penetrates the work.
Figure 4:
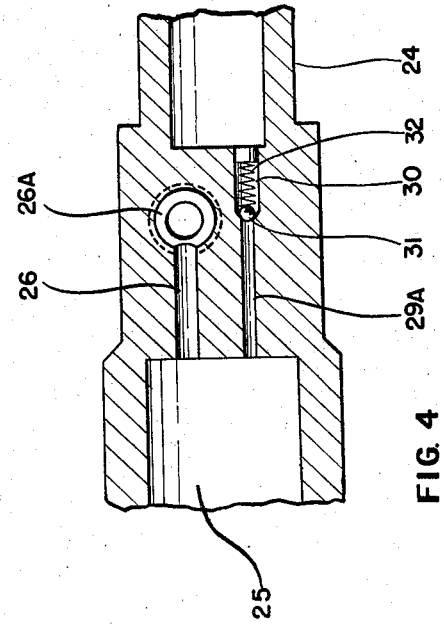
Fig. 4 is an enlarged partial section along the line 4—4 of Fig. 3.

Referring to the drawings, the invention is shown as an attachment generally indicated as 10 attaches to a convention portable rotary drill 11 (Fig. 1) by means of a clamp 12. With regard to the attachment itself, a housing 13 forms a pressure chamber 14 (Fig. 3) adapted to hold a supply of hydraulic fluid. Slidably received in said pressure chamber is a piston 15. A suitable packing material, such as an O ring 16 seals said piston in said pressure chamber. Said piston is supported by a threaded piston rod 17 on which a foot 20 is secured by means of a stop nut 18 and a lock nut 19. The foot contacts the work-piece, or jig 21, during drilling operation. A cylindrical cover 22 is adjustable longitudinally of the threaded rod 17 and during advancement of the drill in the work, telescopes over the housing 13. A retaining ring 23, in a groove on the outside of the housing 13, has an ear projecting through a hole in the housing to contain the piston 15 within the housing, limiting the outward movement of the piston with respect to the chamber 14.

At the rearward end of the pressure chamber 14 is a partition 24 separating the pressure chamber from a surge chamber 25. Within said partition and in communication with the pressure and surge chambers are passages 26 leading to a chamber 26A having a threaded plug 29 adjustable therein serving to regulate the movement of a ball valve 27 away from its seat 28, thereby controlling the flow of fluid from the pressure chamber 14 to the surge chamber 25. Also within said partition and in communication with the pressure and surge chambers is a passage 29A having a ball valve 31 therein maintained to its seat by a spring 32, said valve preventing flow of fluid from the pressure chamber to the surge chamber but permitting its flow in a reverse direction.

The surge chamber 25 contains a plunger 33 biased by means of a spring 34 towards the partition 24. The volume of the surge chamber is adjustable by means of the threaded plug 35.

An intermediate portion of the housing 13 is externally threaded and is adjustably receivable within a bore formed centrally of a saddle 37 which is rigid with the clamp 12. Two support rods 36 are slidably mounted in the saddle 37 and are longitudinally adjustable with respect thereto by means of adjusting sleeves 38 and lock collars 39 on the threaded end portions 40 of the support rods. The front end portions of the support rods 36 are removably secured within suitable tapered sockets formed in the extreme end portions of the foot 20, and each rod 36 has coiled thereabout, between the foot 20 and saddle 37, an expansion spring 41 serving to normally hold the foot, and the elements connected thereto, to the limit of its extended position.

In operation, this device is clamped to a portable drill, reamer or countersink tool with the point of the drill bit, or other tool, in approximate alinement with the forward edge of the foot 20. The drill, or other tool, is started into the work and as soon as the foot comes into contact with the work-piece or jig, the forward feed of the drill, or other tool, continues at the speed predeterminedly selected regardless of the pressure applied to the tool by the operator. This is because the piston 15 must displace the hydraulic fluid in the pressure chamber 14 as it flows past the ball valve 28 into the surge chamber 25. Adjustment of the setting of the threaded plug 29 will vary the rate of fluid displacement and the rate of travel of the piston 15. Upon completion of the operation of the tool and removal of pressure from the foot 20, the piston 15 will return to extended position because of the urging of the return springs 41 and the spring 34 which urges the plunger 33 towards the partition 24 and displaces the hydraulic fluid in the surge chamber 25 as the fluid returns through the one-way return valve 30 to the pressure chamber 14.

The length of stroke permitted by this invention may be adjusted as to starting position by adjustment of the sleeves 38 on the support rods 36 and by adjustment of the stop nut 18 and lock nut 19 on the threaded piston rod 17. The depth of stroke may be adjusted by adjustment of the stop nut 18 and lock nut 19 on the threaded piston rod 17 so that the inside end of the cover 22 stops against the housing 13 and by limiting the stroke of the plunger 33 by adjusting the threaded plug 35.

It will be obvious to one skilled in the art that the structure described lends itself to many variations in design which will fall within the scope of the invention claimed.

We claim as our invention:

1. In combination with a drilling tool, a unit for controlling the rate of feed and depth of penetration of the drill bit into a work-piece comprising: a housing for attachment to said tool having a pressure chamber therein; a piston slidably received in said pressure chamber; a work-piece contacting element carried by said piston; means for restricting the discharge of fluid from said pressure chamber under pressure generated by the telescoping of said piston into said pressure chamber; and said housing having a surge chamber thereing communicating with said pressure chamber through said restricting means.

2. In combination with a drilling tool, a unit for controlling the rate of feed and depth of penetration of a drill bit into a work-piece comprising: a housing for attachment to said tool having a pressure chamber therein; a piston slidably received in said pressure chamber; a work-piece contacting element carried by said piston; means for restricting the discharge of fluid from said pressure chamber under pressure generated by the telescoping of said piston into said pressure chamber; said housing having a surge chamber therein communicating with said pressure chamber through said restricting means; and a slidable plunger in said surge chamber and resilient means urging said plunger in one direction.

3. A drill unit for controlling the rate of feed and depth of penetration into a work-piece, said unit comprising: a housing having a pressure chamber therein; a piston slidably received in said pressure chamber; a work-piece contacting element secured to said piston; means for restricting the discharge of fluid from said pressure chamber under pressure generated by the telescoping of said piston into said pressure chamber; said housing having a surge chamber therein communicating with said pressure chamber through said restricting means; a slidable plunger in said surge chamber and resilient means urging said plunger in one direction; and adjustable means for limiting the travel of said plunger.

4. A drill unit for controlling the rate of feed and depth of penetration into a work-piece, said unit comprising: a housing having a pressure chamber therein; a piston slidably received in said pressure chamber; a work-piece contacting element secured to said piston; means for restricting the discharge of fluid from said pressure chamber under pressure generated by the telescoping of said piston into said pressure chamber; said housing having a surge chamber therein communicating with said pressure chamber through said restricting means; a return port in communication with said pressure chamber and said surge chamber; and a check valve in said return port adapted to admit fluid to said pressure chamber when the pressure of fluid in said surge chamber exceeds the pressure of fluid in said pressure chamber.

5. In combination with a drilling tool, a unit for controlling the rate of feed and depth of penetration of a drill bit into a work-piece comprising: a housing for attachment to said tool having a pressure chamber therein; a piston slidably received in said pressure chamber; a work-piece contacting element secured to said piston; means for restricting the discharge of fluid from said pressure chamber under pressure generated by the telescoping of said piston into said pressure chamber; said housing having a surge chamber therein communicating with said pressure chamber through said restricting means; a slidable plunger in said surge chamber and resilient means urging said plunger in one direction; and resilient means biasing said work-piece contacting element and piston into extended position.

6. A drill unit for controlling the rate of feed and depth of penetration into a work-piece, said unit comprising: a housing having a pressure chamber therein; a piston slidably received in said pressure chamber; a work-piece contacting element secured to said piston; means for restricting the discharge of fluid from said pressure chamber under pressure generated by the telescoping of said piston into said pressure chamber; said housing having a surge chamber therein communicating with said pressure chamber through said restricting means; a slidable plunger in said surge chamber and resilient means urging said plunger in one direction; adjustable means for limiting the travel of said plunger; and resilient means biasing said work-piece contacting element and piston into extended position.

7. A drill unit for controlling the rate of feed and depth of penetration into a work-piece, said unit comprising: a housing having a pressure chamber therein; a piston slidably received in said pressure chamber; a work-piece contacting element secured to said piston; means for restricting the discharge of fluid from said pressure chamber under pressure generated by the telescoping of said piston into said pressure chamber; said housing having a surge chamber therein communicating with said pressure chamber through said restricting means; a slidable plunger in said surge chamber and resilient means urging said plunger in one direction; resilient means biasing said work-piece contacting element and piston into extended position; and an adjustable stop element adapted to limit travel of said piston under the urging of said resilient biasing means.

8. An attachment for a drill for controlling the rate of feed and depth of penetration into a work-piece, said attachment comprising: a housing having a pressure chamber therein; a piston slidably received in said pressure chamber, a work-piece contacting element secured to said piston; means for restricting the discharge of fluid from said pressure chamber under pressure generated by the telescoping of said piston into said pressure chamber; said housing having a surge chamber therein communicating with said pressure chamber through said restricting means; a slidable plunger in said surge chamber and resilient means urging said plunger in one direction; resilient means biasing said work-piece contacting element and piston into extended position; and an adjustable stop element adapted to limit travel of said piston under the urging of said resilient biasing means.

9. A drill unit for controlling the rate of feed and depth of penetration into a work-piece, said unit comprising: a housing having a fluid pressure chamber therein; a piston slidably received in said pressure chamber; an adjustable stop member adapted to limit travel of said piston into said pressure chamber; a work-piece contacting element secured to said piston; means for restricting the discharge of fluid from said pressure chamber under pressure generated by the telescoping of said piston into said pressure chamber; said housing having a surge chamber therein communicating with said pressure chamber through said restricting means; a slidable plunger in said surge chamber; resilient means urging said plunger in one direction; a second resilient means biasing said work-piece contacting element and piston into extended position; and an adjustable stop element adapted to limit travel of said piston under the urging of said resilient biasing means.

10. An attachment for a drill for controlling the rate of feed and depth of penetration into a work-piece, said attachment comprising: a housing having a fluid pressure chamber therein; a piston slidably received in said pressure chamber; an adjustable stop member adapted to limit travel of said piston into said pressure chamber; a work-piece contacting element secured to said piston; means for restricting the discharge of fluid from said pressure chamber under pressure generated by the telescoping of said piston into said pressure chamber; said housing having a surge chamber therein communicating with said pressure chamber through said restricting means; a slidable plunger in said surge chamber; resilient means urging said plunger in one direction; a second resilient means biasing said work-piece contacting element and piston into extended position; and an adjustable stop element adapted to limit travel of said piston under the urging of said resilient biasing means.

References Cited in the file of this patent

UNITED STATES PATENTS

| | | |
|---|---|---|
| 706,688 | Reynders et al. | Aug. 12, 1902 |
| 2,360,942 | Ellerstein | Oct. 24, 1944 |
| 2,669,887 | Rees | Feb. 23, 1954 |
| 2,670,638 | Roy | Mar. 2, 1954 |
| 2,674,138 | Mize | Apr. 6, 1954 |